United States Patent [19]

Ching

[11] Patent Number: 5,626,446
[45] Date of Patent: May 6, 1997

[54] FLAT DRILL BIT WITH OPPOSING VERTICAL CUTTING EDGES

[76] Inventor: Edwin K. W. Ching, P.O. Box 8648, Tamuning, Guam 96911

[21] Appl. No.: 512,877

[22] Filed: Aug. 9, 1995

[51] Int. Cl.[6] .............................. B23B 51/08; B23C 5/10
[52] U.S. Cl. .......................... 408/1 R; 144/219; 407/54; 408/21; 408/223; 408/227
[58] Field of Search .................... 408/223–228, 408/21, 22, 26, 1 R; 407/54; 144/219

[56] References Cited

U.S. PATENT DOCUMENTS

| | | |
|---|---|---|
| 777,543 | 12/1904 | Rich . |
| 984,323 | 2/1911 | Vauclain . |
| 1,476,019 | 12/1923 | Lowry ............................. 407/54 |
| 1,702,812 | 2/1929 | Cochran ......................... 407/54 |
| 2,587,980 | 3/1952 | Doepker .......................... 77/67 |
| 2,621,548 | 12/1952 | Williams ........................ 407/54 |
| 2,889,725 | 6/1959 | Turton et al. .................... 77/67 |
| 3,116,654 | 1/1964 | Nider .............................. 77/67 |
| 3,409,965 | 11/1968 | Fisher ........................... 29/103 |
| 3,477,481 | 11/1969 | Czerniewicz .................. 144/144 |
| 3,656,521 | 4/1972 | Czerniewicz .................. 408/228 |
| 4,114,507 | 9/1978 | Fischer et al. ................... 85/41 |
| 4,286,904 | 9/1981 | Porter et al. ................... 408/225 |
| 4,682,917 | 7/1987 | Williams, III et al. .......... 408/212 |
| 5,061,127 | 10/1991 | Thomas ......................... 408/213 |
| 5,221,166 | 6/1993 | Bothum ......................... 408/212 |

*Primary Examiner*—Steven C. Bishop
*Attorney, Agent, or Firm*—Seed and Berry LLP

[57] ABSTRACT

A flat drill bit having a shaft with an axis of rotation and a flat drill bit head connected to the shaft. The flat drill bit head includes opposing flat front and back faces, left and right edgewalls between the front and back faces, and a bottom endwall connected to the left and right edgewalls. The left and right edgewalls are angled relative to the front and back faces so as to define left and right cutting edges that are parallel to the axis of rotation. The bottom endwall includes left and right sections, each being angled in opposite directions relative to the front and back faces so as to define left and right bottom cutting edges. The bottom endwall of the drill bit head has a rounded shape thereby providing curved left and right bottom cutting edges. In an alternate embodiment the bottom endwall is generally straight, thereby providing straight left and right bottom cutting edges.

19 Claims, 3 Drawing Sheets

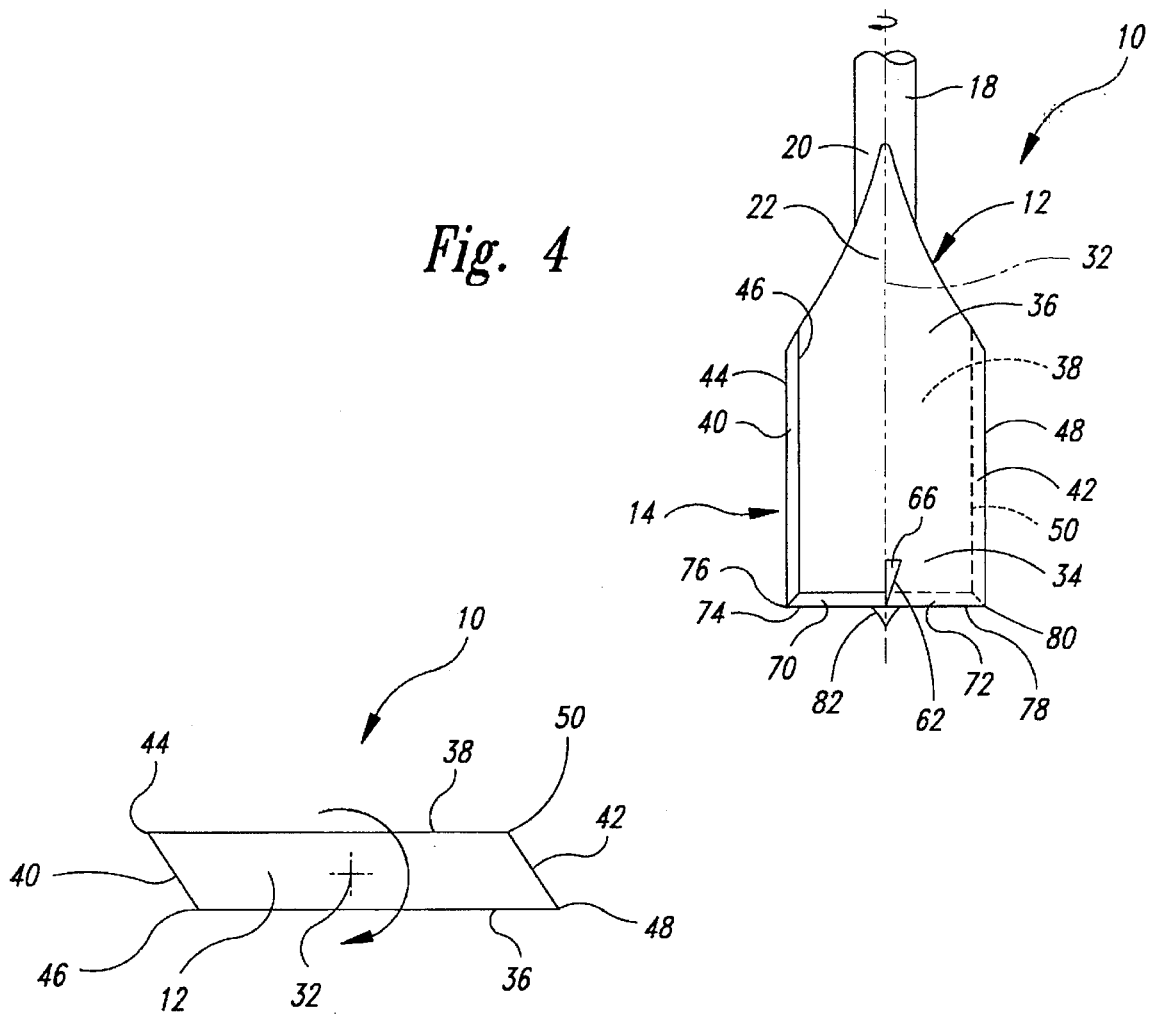
Fig. 4
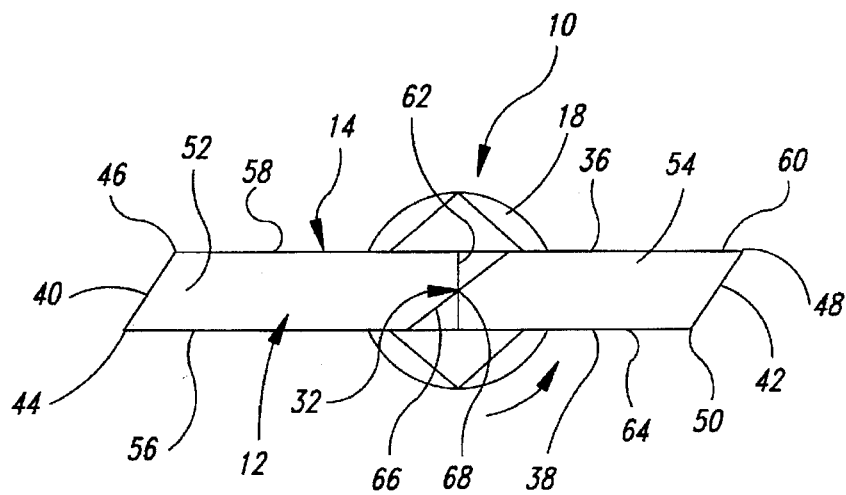
Fig. 2
Fig. 3

FLAT DRILL BIT WITH OPPOSING VERTICAL CUTTING EDGES

DESCRIPTION

1. Technical Field

The present invention relates to cutting tools and, more particularly, to rotatable cutting tools generally used with an electric or pneumatic drill for boring depressions in a work piece.

2. Background of the Invention

Several conventional tools for cutting and removing material from a work piece to create a hole, depression, or groove in the work piece are well known in the art. Some of these conventional tools include fluted drill bits, spade drill bits, and other rotating tool bits. The fluted drill bits and spade drill bits have cutting edges adapted to cut and remove material from the work piece as the drill bit is pressed downwardly into engagement with the work piece. The result is a clean, substantially cylindrical hole in the work piece. The fluted drill bits have a twisted cutting edge that removes material from the work piece, by cutting and slicing the work piece at or near the bottom of the resulting hole. The twisted cutting edges of the fluted drill bit are shaped and angled such that they do not cut or remove material along the edgewalls of the cylindrical hole during the drilling operation so as to widen the hole.

Similarly, spade drill bits such as those described in U.S. Pat. No. 4,286,904 and U.S. Pat. No. 4,682,917 have substantially flat drill bit heads, with bottom cutting edges. The bottom cutting edges cut material away from the work piece at the bottom of the resulting hole during a drilling operation. The result is a clean, cylindrical hole having straight edgewalls that extend along the depth of the hole. The sides of the spade bit are constructed such that they do not cut or remove material along the edgewalls of the cylindrical hole during the drilling operation so as to widen the hole. Accordingly, the conventional fluted drill bits and spade drill bits are not suitable for cutting and removing material from the sides of a depression to form a generally concave groove or a widened depression that has a cross-sectional dimension substantially greater than the cross-sectional dimension of the drill bit being used. In addition, conventional fluted drill bits and spade drill bits are not adapted to flatten or smooth the bottom portions of a widened hole or depression.

Other conventional cutting tools are disclosed in U.S. Pat. Nos. 984,323; 3,477,481; 2,587,980; 3,116,654; 2,889,725; 777,534; 3,409,965; and 4,114,507. Each of the drill bits or other cutting tools identified in these patents experience a significant disadvantage of not being able to quickly cut downwardly and laterally so as to form a widened, substantially concave depression in a quick, uniform, and efficient manner.

Conventional hand grinders, such as a Dremel tool, are used with a wide range of tool bits for grinding and cutting material of a work piece. Several of the different styles of the tool bits that are used to shape a work piece include multiple cutting edges on an enlarged head area. The hand grinder cutting tools are adapted to cut away and remove material to shape a selected portion of a work piece, such as the edgewalls of existing depressions. However, these tool bits for hand grinders are not adapted for use with a drill and are not designed to cut or drill downwardly into the work piece and also to cut laterally into the edgewalls of the resulting hole to create a widened, substantially concave depression in a quick and efficient manner. Use of a hand grinder tool bit for a drilling type operation to cut a widened depression within a work piece is not an intended use of the tool and is a very time consuming and labor-intensive process.

SUMMARY OF THE INVENTION

The present invention is directed toward a drill bit having a flat drill bit head with bottom cutting edges and opposing vertical cutting edges adapted to cut downwardly and laterally into a work piece to form a depression having a lateral dimension that is larger than the lateral dimension of the head. In a preferred embodiment of the invention, the drill bit has a drill bit shaft connected to the flat drill bit head, and the drill bit rotates about an axis of rotation extending through the shaft and the drill bit head. The drill bit head includes opposing front and back faces and opposing first and second sides each connected to the front and back faces. The first side engages the back face at an acutely angled intersection which defines a first cutting edge that is parallel to the axis of rotation. The second side of the flat drill bit head engages a front face at an acutely angled intersection that defines a second cutting edge that is parallel to the axis of rotation.

The flat drill bit head also includes a bottom side extending between the front and back faces. The bottom side engages the front and back faces at acutely angled intersections which define a bottom cutting edge that extends between, and is connected to, the first and second cutting edges. The result is a flat drill bit head having cutting edges that extend along the opposing sides and the bottom side of the drill bit head.

In the preferred embodiment of the invention, the bottom side of the drill bit head is rounded, thereby providing a bottom cutting edge that is curved relative to the first and second sides. The curved bottom cutting edge facilitates in cutting a widened depression in a work piece such that the depression has a dish-like shape with a rounded bottom portion. In an alternate embodiment of the invention, the bottom side of the drill bit head is substantially straight and perpendicular to the axis of rotation, thereby providing a straight bottom cutting edge. The straight bottom cutting edge is adapted to cut a widened depression in a work piece with the depression having a generally flat bottom portion. In yet another embodiment of the invention, the bottom side of the flat drill bit head has an alignment member attached to the bottom side that extends away from the bottom side substantially along the axis of rotation. The alignment member provides a guiding device that assists in guiding the flat drill bit head relative to the work piece during a cutting operation.

BRIEF DESCRIPTION OF THE DRAWINGS

FIG. 2 is an enlarged cross-sectional view taken substantially along line 2—2 of FIG. 1.

FIG. 3 is an enlarged bottom plan view of the drill bit of FIG. 1.

FIG. 4 is a fragmented side elevation view of an alternate embodiment of the drill bit of the present invention.

DETAILED DESCRIPTION OF THE INVENTION

Figure 1:
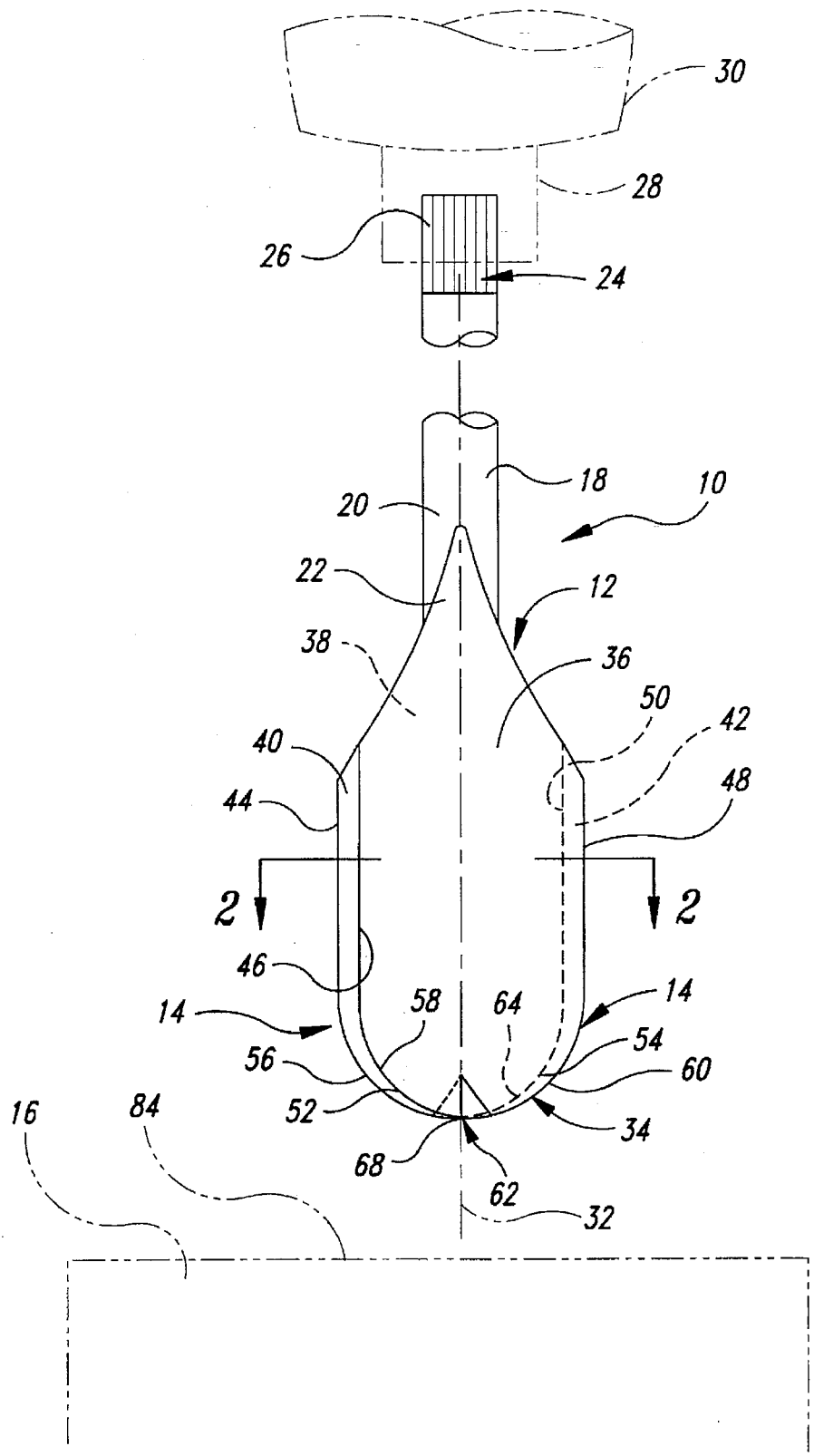
FIG. 1 is a fragmented side elevation view of the drill bit in accordance with the present invention positioned above a work piece shown in phantom.

As best seen in FIG. 1, a drill bit 10 in accordance with the present invention has a generally flat head 12 with a plurality of cutting edges 14 for cutting a work piece 16, shown in phantom lines. The drill bit 10 also has an elongated shaft 18 integrally connected at its bottom portion 20 to an upper portion 22 of the head 12. The drill bit 10 is described herein with a spatial reference to the drill bit as being positioned in a substantially vertical orientation as is illustrated in FIG. 1. A top portion 24 of the shaft 18 opposite the bottom portion 20 has a grip section 26 that is shaped and sized to be removably gripped by a chuck 28 of a conventional electric or pneumatic drill 30, shown in phantom lines.

The drill 30 rotates the chuck 28 which causes the drill bit 10 to rotate about an axis of rotation 32 that extends through the shaft 18 and the head 12 of the drill bit. The flat head 12 and the shaft 18 are coaxially aligned and they are each substantially symmetric about the axis of rotation 32. In the illustrated embodiment, the drill 30 rotates the drill bit 10 in a clockwise direction about the axis of rotation 32 when viewed from above.

As best seen in FIGS. 1, 2, and 3, the head 12 is a generally flat, spade-like drill bit head that forms the bottom-most end portion of the drill bit 10, and the head includes a bottom portion 34 opposite the head's upper portion 22. The head 12 extends downwardly from its upper portion 22, and flares outwardly away from the axis of rotation 32 such that the width of the head is substantially greater than the width of the shaft 18. The head 12 has opposing, flat front and back faces 36 and 38 that extend between the head's top portion 22 and bottom portion 34. The front and back faces 36 and 38 are substantially parallel to each other, and they each define a plane that is parallel to the axis of rotation 32.

The head 12 of the drill bit 10 also includes opposing left and right edgewalls 40 and 42, respectively, that extend between the flat front and back faces 36 and 38 and which extend vertically between the head's top portion 22 and the bottom end 34. Each of the left and right edgewalls 40 and 42 is a substantially straight, vertically oriented edgewall that is parallel to the drill bit's axis of rotation 32.

As best seen in FIGS. 2 and 3, the left edgewall 40 is angled relative to the front and back faces 36 and 38, such that the left edgewall intersects the back face and forms an acute angle relative to the back face. As a result, the intersection of the left edgewall 40 and the back face 38 forms a sharp, substantially vertical, left side cutting edge 44 that is parallel to the axis of rotation 32. A left trailing corner 46 is formed at the intersection of the left edgewall 40 and the from face 36, wherein the intersection defines an obtuse angle. The left trailing corner 46 is positioned radially inwardly from the left side cutting edge 44 such that, upon counter-clockwise rotation of the drill bit 10 (when viewed from below in FIG. 3), the left side cutting edge leads the left trailing corner and engages and cuts material from the work piece 16 (FIG. 1). The left trailing corner 46 does not engage the work piece or interfere with the cutting operation of the left side cutting edge 44.

Similar to the left edgewall 40, the right edgewall 42 is angled relative to the front and back faces 36 and 38, and the right edgewall intersects the front face and forms an acute angle relative to the front face. The intersection of the right edgewall 42 and the front face 36 forms a sharp, substantially vertical, right side cutting edge 48 that is parallel to the axis of rotation 32. Accordingly, the right side cutting edge 48 is substantially opposite the left side cutting edge 44. A right trailing corner 50 is formed at the intersection of the right edgewall 42 and the back face 38, wherein the intersection defines an obtuse angle. The right trailing corner 50 is opposite the left trailing corner 46 and is positioned radially inwardly from the right side cutting edge 48. Upon the counter-clockwise rotation of the drill bit 10 (when viewed from below in FIG. 3), the right side curing edge 48 leads the right trailing corner 50 and engages and cuts material from the work piece 16 (FIG. 1). The right trailing corner 50 does not engage the work piece 16 or interfere with the cutting operation of the right side cutting edge 48.

As best seen in FIG. 1, the bottom portion 34 of the head 12 extends between the left and right edgewalls 40 and 42. The bottom portion 34 has a bottom left section 52 that is integrally connected to the left edgewall 40, and a bottom right section 54 that is integrally connected to the right edgewall 42. The bottom left and right sections 52 and 54 are connected together at approximately the axis of rotation 32. The bottom left section 52 is angled relative to the front and back faces 36 and 38 such that the bottom left section intersects the back face at an acute angle which defines a left bottom cutting edge 56. The left bottom cutting edge 56 extends outwardly from approximately the axis of rotation 32 and is integrally connected at its outer end to the left side cutting edge 44.

A bottom left trailing corner 58 is formed at the intersection of the bottom left section 52 and the front face 36, wherein the intersection defines an obtuse angle. The bottom left trailing corner 58 is integrally connected to the left trailing corner 46 and is positioned above the left bottom cutting edge 56. Upon counterclockwise rotation of the drill bit 10 (when viewed from below in FIG. 3), the left bottom cutting edge 56 engages and cuts material from the work piece 16 and the bottom left trailing corner 58 does not engage or interfere with the cutting operation of the left bottom cutting edge.

The bottom right section 54 of the head 12 is angled relative to the front and back faces 36 and 38 such that the bottom right section intersects the front face at an acute angle and defines a right bottom cutting edge 60. The right bottom cutting edge 60 extends outwardly from approximately the axis of rotation 32 and is integrally connected at its outer end to the right side cutting edge 48. As best seen in FIG. 3, the right bottom cutting edge 60 is connected to the left bottom cutting edge 56 by a transition area 62 that is positioned substantially along the axis of rotation 32. Accordingly, the left and right bottom cutting edges 56 and 60 form a bottom cutting edge that extends between the left and right side cutting edges 44 and 48.

A bottom right trailing corner 64 is formed at the intersection of the bottom right section 54 and the back face 38, wherein the intersection defines an obtuse angle. The bottom right trailing corner 64 is integrally connected to the right trailing corner 50 and is positioned above the right bottom cutting edge 60 such that the right bottom cutting edge cuts material from the work piece 16 and the bottom right trailing corner 64 does not engage the work piece.

Accordingly, the left side cutting edge 44 and the left bottom cutting edge 56 form a continuous cutting edge along the left side of the drill bit head 12. Similarly, the right side cutting edge 48 and the right bottom cutting edge 60 form a continuous cutting edge along the right side of the drill bit head.

As best seen in FIGS. 1 and 3, the transition area 62 includes notched portions 66 formed in the front and back faces 36 and 38 at the bottom end 34 of the head 12. The notched portions 66 extend inwardly from the respective front and back faces 36 and 38 and are wedge-shaped notches such that the bottom left and bottom right cutting edges 56 and 60 extend along the bottom-most portion of the notched portions inwardly toward each other and toward the axis of rotation 32. Accordingly, the left and right bottom cutting edges 56 and 60 terminate at approximately the axis of rotation 32.

The notched portions 66 of the transition area 62 combine with the bottom left section 52 and the bottom right section 54 to define an alignment point 68 at the axis of rotation 32. The alignment point 68 assists in aligning the drill bit head 12 on the work piece 16 in a desired location as the drill bit head is rotating during the initiation of a cutting operation. However, the alignment point 68 of the preferred embodiment is shaped and sized short enough and small enough so as not to interfere or restrict lateral movement of the drill bit 10 during the cutting operation.

As best seen in FIG. 1, the bottom portion 34 of the drill bit's head 12 is a rounded bottom portion such that the left and right bottom cutting edges 56 and 60 are curved cutting edges that provide a smooth transition from the substantially vertical left and right side cutting edges 44 and 48 of the left and right edgewalls 40 and 42. The rounded bottom portion 34 of the head 12 is shaped to remove material from the work piece 16 to cut depressions therein having a rounded bottom surface. As a result, the depressions are generally cut as concave depressions that have a dish-like cross-sectional shape, as discussed below with respect to FIG. 5.

In the preferred embodiment, the flat drill bit 10 is a hardened steel drill bit that can be sharpened and resharpened, as needed, after use. However, the drill bit 10 can be constructed of other suitable materials as is needed to perform the desired cutting operation.

In an alternate embodiment of the invention illustrated in FIG. 4, the bottom portion 34 of the drill bit head 12 is generally straight and perpendicular to the axis of rotation 32. The bottom portion 34 includes a straight bottom left section 70 and a straight bottom right section 72, wherein the bottom left section is connected at its outer end to the left edgewall 40 and extends inwardly, to the axis of rotation 32. The straight bottom right section 72 is connected at its outer end to the right edgewall 42 and extends inwardly toward the axis of rotation 32 such that the straight bottom right section connects to the straight bottom left section 70. The straight bottom left and right sections 70 and 72 are substantially perpendicular to the respective left and right edgewalls 40 and 42. Accordingly, the alternate embodiment provides a drill bit 10 having a head 12 with a generally square bottom portion.

The straight bottom left and right sections 70 and 72 are angled relative to the front and back faces 36 and 38, and an acutely angled left bottom cutting edge 74 is formed at the intersection of the straight bottom left section and the back face. The left bottom cutting edge 74 is connected to the left cutting edge 44 at a lower left corner portion 76 of the drill bit head 12. An acutely angled right bottom cutting edge 78 is formed at the intersection of the straight bottom right section 72 and the front face 36. The right bottom cutting edge 78 is connected to the right cutting edge 48 at a right corner 80 of the drill bit head 12. The right bottom cutting edge 78 is coupled to the left bottom cutting edge 56 at the axis of rotation 32 of the drill bit head 12 to provide a straight cutting edge along the drill bit head's bottom portion 34.

This square-headed alternate embodiment of the present invention is utilized to cut and widen a depression in a work piece such that the depression has a generally flat bottom section. The straight cutting edges 74 and 78 on the drill bit head's bottom portion 34 are particularly useful, for example, in leveling or smoothing out chiseled surfaces that would be inaccessible to sanders or the like. Thus, the drill bit 10 of the alternate embodiment is effectively used to cut, for example, a widened, flat channel section in a work piece wherein the channel section has a width that is substantially greater than the width of the drill bit head 12.

In the alternate embodiment illustrated in FIG. 4, a pointed alignment member 82 extends downwardly away from the straight bottom left and right sections 70 and 72, at their intersection, so as to form a pointed section on the bottom portion 34 of the drill bit head 12 substantially along the axis of rotation 32. The pointed alignment member 82 is shaped and sized to provide alignment guidance for the drill bit head 12 relative to the work piece (not shown), during a drilling operation. The pointed alignment member 82 is shaped and sized so it does not restrict lateral movement of the head 12 relative to the work piece during a cutting operation.

In an alternate embodiment (not illustrated), the left and right bottom curing edges of the drill bit head are machined at opposite angles along their entire lengths, such that each of the left and right bottom cutting edges terminate immediately adjacent to each other and to the axis of rotation and on opposite sides of the axis of rotation. Accordingly, the left and right bottom cutting edges form a pair of alignment points on the bottom end of the head at the axis of rotation. The pair of alignment points can be formed upon machining the left and right bottom cutting edges whether the head has the rounded bottom end or the straight bottom end, or a different shaped bottom end.

Figure 5:
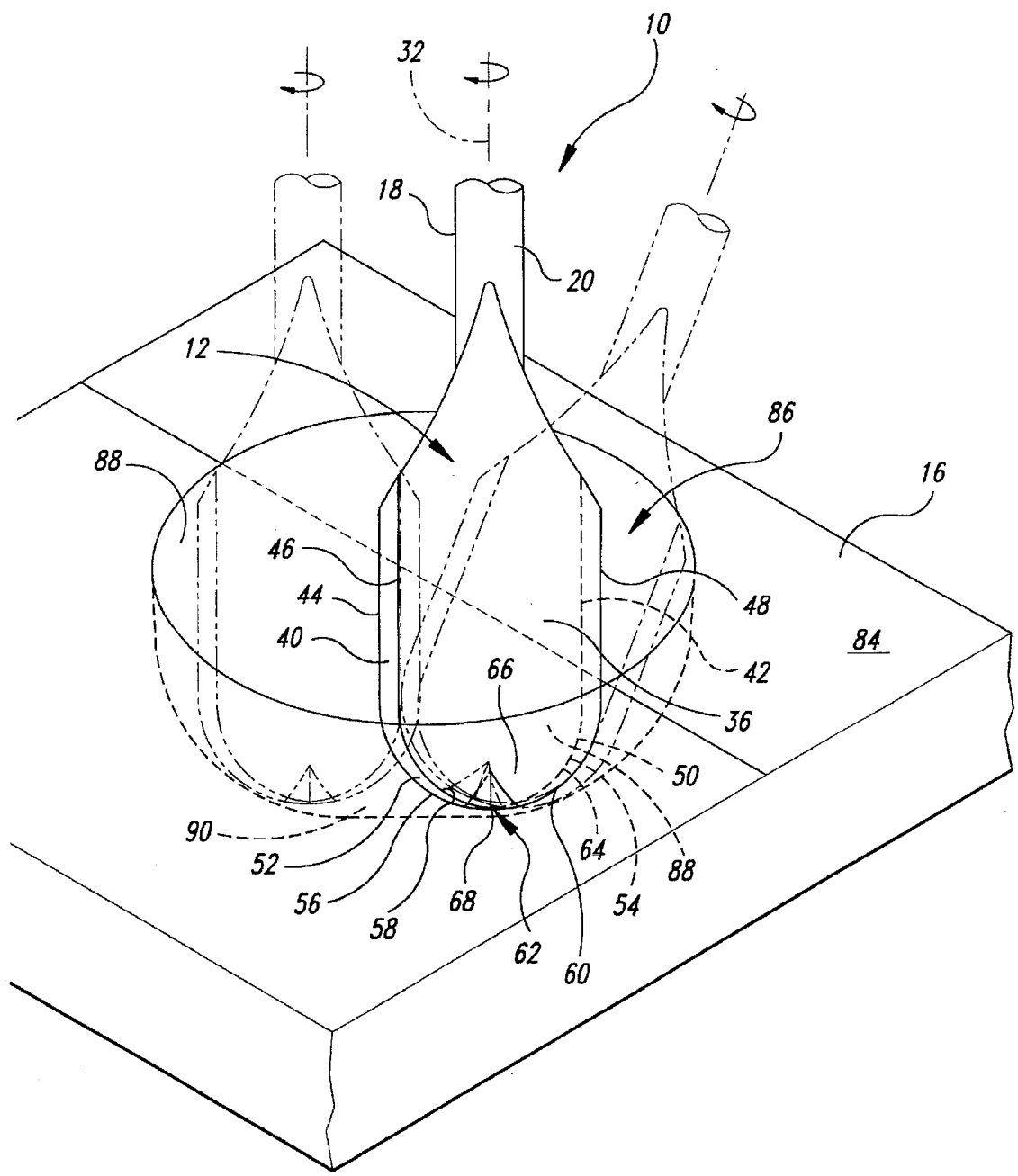
FIG. 5 is a partial isometric view of a work piece with a depression cut therein and with the drill bit of FIG. 1 positioned in the depression, the drill bit being shown in solid lines in a first cutting position, and shown in phantom lines in alternate cutting positions.

In operation, the drill bit 10 of the present invention, illustrated in FIG. 5, is rotated about the axis of rotation 32 such that the left and right side cutting edges 44 and 48 and the left and right bottom cutting edges 56 and 60 rotate through a cutting stroke. The left and right side trailing comers 46 and 50 and left and right bottom trailing comers 58 and 64 follow their respective cutting edges. The rotating head 12 is pressed into engagement with the work piece 16, such as a block of wood, or the like, having a top surface 84. The best results occur when the rotating head 12 is pressed into engagement with the work piece 16 as the rotating head and the axis of rotation 32 are oriented substantially perpendicular to the top surface 84 of the work piece 16 during an initial cut.

As the rotating head 12 is pressed into engagement with the work piece 16, force is exerted on the drill bit 10, thereby pressing the left and right bottom cutting edges 56 and 60 firmly into contact with the work piece. These cutting edges cut and remove material from the work piece with a cutting and chopping stroke. The chopping action produces a fairly rough cut, but the rotating drill bit head 12 cuts very quickly through the work piece, particularly when the work piece is a soft material such as wood or lead. The result is a cut having a shape that generally corresponds to the shape of the bottom portion 34 of the head 12. In the illustrated embodiment, the round bottom portion 34 of the head 12 cuts a generally rounded depression 86 in the work piece 16.

When the rotating drill bit head 12 cuts downwardly into the work piece 16 and the bottom portion 34 has cut a sufficient depth into the work piece, the cutting strokes of the left and right bottom cutting edges 56 and 60 form edgewalls 88 of the depression 86. Accordingly, the left and right side cutting edges 44 and 48 rotate adjacent to the edgewalls 88 of the depression 86, when the rotating drill bit head 12 is pressed straight into the work piece 16 in a perpendicular orientation, similar to a conventional drilling procedure. The rotating drill bit head 12 is then moved, as an example, in a circular or lateral motion within the depression 86 while maintaining the axis of rotation 32 of the rotating drill bit 10 substantially perpendicular to the work piece 16, as shown in phantom lines in FIG. 5, and the left and right side cutting edges 44 and 48 are moved into engagement with the edgewalls 88 of the depression 86, thereby cutting and raking material of the work piece 16 away from the edgewalls to widen the depression.

The circular and lateral motion of the rotating drill bit head 12 moves the drill bit head in at least two dimensions relative to the work piece 16. Circular or lateral motions of the rotating head 12 can be done simultaneously with vertical motion such that the left and right side cutting edges 44 and 48 widen the depression 86 as the left and right bottom cutting edges 56 and 60 cut downwardly into the work piece 16 and increase the depth of the depression 86.

When the axis of rotation 32 of the rotating drill bit 10 remains substantially perpendicular to the work piece 16 during the cutting operation as shown in FIG. 5, the edgewall 88 can be cut by the left and right side cutting edges 44 and 48 such that the edgewalls remain substantially vertical. Alternatively, the rotating drill bit 10 can be tilted during the cutting operation, as illustrated in FIG. 5 in phantom lines, such that the axis of rotation 32 is angled relative to the work piece 16, and the left and right side cutting edges 44 and 48 cut away the selected edgewall 88 at an angle, thereby forming an angled edgewall that angles downwardly from the top surface 84 and connects to a bottom portion 90 of the depression.

During the cutting operation, the size and shape of the depression 86 is controlled by applying lateral or axial pressure, or a combination thereof, on the rotating drill bit 10, so as to press the desired left and right side cutting edges 44 and 48 and the left and right bottom cutting edges 56 and 60 into engagement with a selected area of the work piece 16 to define the depression. The rotating drill bit 10 can, thus, be used to create widened depressions having, for example, rounded bottoms or straight bottoms.

Numerous modifications and variations of the flat drill bit with opposing vertical cutting edges disclosed herein will occur to those skilled in the art in view of this disclosure. For example, the bottom end of the drill bit head may be constructed so as to have a sloped shape, a partially curved shape with different degrees of curvature, or some other shape to obtain a desired shape depression in the work piece to facilitate a selected cutting operation. Therefore, it is to be understood that these modifications and variations may be practiced while remaining within the spirit and scope of the invention as defined by the following claims.

I claim:

1. A flat drill bit head connected to a drill bit shaft having an axis of rotation, comprising:

opposing flat front and back faces;

a flat first side extending between said front and back faces, said first side being parallel to the axis of rotation, said first side being at an angle relative to said back face to define a continuous first cutting edge parallel to the axis of rotation;

a flat second side extending between said front and back faces, said second side being parallel to the axis of rotation and spaced away from and opposite said first side, said second side being at an angle relative to said front face to define a continuous second cutting edge parallel to the axis of rotation; and a bottom side extending between said first and second sides, said bottom side being at an angle relative to said front and back faces to define a continuous bottom cutting edge that extends fully between said first and second cutting edges, each of said first and second cutting edges being connected to said bottom cutting edge to define one of an obtuse angle and a right angle therebetween to allow the drill bit head to cut a workpiece in a direction parallel to the axis of rotation to form a depression and to allow movement and cutting of the workpiece in a direction transverse to the axis of rotation to transversely enlarge the depression.

2. The flat drill bit head of claim 1 wherein said bottom side is substantially straight and said bottom cutting edge is substantially perpendicular to the axis of rotation and to said first and second sides.

3. The flat drill bit head of claim 2, further including a pointed alignment member attached to said bottom side, said pointed alignment member extending away from said bottom side substantially along the axis of rotation.

4. The flat drill bit head of claim 1 wherein said bottom side and said bottom cutting edge are curved relative to said first and second sides.

5. The flat drill bit head of claim 4, further including a pointed alignment member attached to said bottom side, said pointed alignment member extending away from said bottom side substantially along the axis of rotation.

6. A drill bit, comprising a shaft having an axis of rotation and a flat drill bit head connected to said shaft, said flat drill bit head having opposing flat front and back faces, a flat first edgewall extending between said front and back faces, a flat second edgewall extending between said front and back faces opposite said first edgewall, and a bottom endwall connected to said first and second edgewalls, said first edgewall being parallel to said axis of rotation and being at an angle relative to said front and back faces, said first edgewall angled relative to said back face to define a first cutting edge parallel to said axis of rotation, said second edgewall being parallel to said axis of rotation and being at an angle relative to said front and back faces, said second edgewall angled relative to said front face to define a second cutting edge parallel to said axis of rotation, said bottom endwall extending between said front and back faces and defining a bottom cutting edge that extends continuously between and is connected to said first and second cutting edges, each of said first and second cutting edges being connected to the bottom cutting edge to define one of an obtuse angle and a right angle therebetween.

7. The drill bit of claim 6 wherein said bottom endwall is substantially straight and said bottom cutting edge is substantially perpendicular to said axis of rotation and to said first and second edgewalls.

8. The drill bit of claim 7 further including a pointed alignment member attached to said bottom endwall, said pointed alignment member extending away from said bottom endwall substantially along said axis of rotation.

9. The drill bit of claim 6 wherein said bottom cutting edge includes first and second curved portions that define a curved path, said first curved portion extending between said first cutting edge and a termination point along said curved path, and said second curved portion extending between said second cutting edge and said termination point, said first and second curved portions and said first and second cutting edges defining a continuous cutting edge.

10. The drill bit of claim 9, further including a pointed alignment member attached to said bottom endwall, said pointed alignment member extending away from said bottom wall substantially along said axis of rotation.

11. A drill bit, comprising a shaft having an axis of rotation and a drill bit head connected to said shaft, said drill bit head having a substantially flat front face parallel to said axis of rotation, a substantially flat back face opposite said front face, a top portion adjacent to said shaft, a bottom endwall opposite said top portion, and left and right edgewalls extending between said top portion and said bottom endwall, said left edgewall being parallel to said axis of rotation and at an angle relative to said back face to define a left cutting edge parallel to said axis of rotation, said right edgewall being parallel to said axis of rotation and at an angle relative to said front face to define a right cutting edge parallel to said axis of rotation, said bottom endwall extending between said front and back faces and defining a continuous bottom cutting edge that extends continuously between said left and right cutting edges, each of said left and right cutting edges being connected to the bottom cutting edge and to define one of an obtuse angle or a right angle therebetween to allow the drill bit to cut a workpiece in a direction parallel to the axis of rotation to form a depression and to allow movement and cutting of the workpiece in a direction transverse to the axis of rotation to transversely enlarge the depression.

12. The drill bit of claim 11 wherein said bottom endwall is substantially straight and said bottom cutting edge is substantially perpendicular to said longitudinal axis of rotation and to said left and right edgewalls.

13. The drill bit of claim 12, further including a pointed alignment member attached to said bottom endwall, said pointed alignment member extending away from said bottom endwall substantially along said axis of rotation.

14. The drill bit of claim 11 wherein said bottom endwall and said bottom cutting edge are curved relative to said left and right edgewalls.

15. The drill bit of claim 14, further including a pointed alignment member attached to said bottom endwall, said pointed alignment member extending away from said bottom endwall substantially along said axis of rotation.

16. A drill bit for use with a drill to perform a cutting operation, comprising:

a shaft having first and second ends, said first end being shaped to be engaged by the drill, and a second end opposite said first end, said shaft having a longitudinal axis of rotation about which the drill bit rotates during the cutting operation; and a drill bit head integrally connected to said second end of said shaft, said drill bit head having:

a top portion attached to said second end of said shaft;

a substantially flat front face parallel to said longitudinal axis of rotation;

a substantially flat back face opposite said front face and parallel to said longitudinal axis of rotation;

a straight and flat left side portion between said front and back faces, said left side portion being parallel to said longitudinal axis of rotation, said left side portion being at an angle relative to said front and back faces, said left side portion intersecting said back face and defining an acutely angled, continuous left cutting edge therebetween, said left side portion intersecting said front face defining a first obtuse angle therebetween;

a straight and flat right side portion between said front and back faces, said right side portion being parallel to said longitudinal axis of rotation, said right side portion being at an angle relative to said front and back faces, said right side portion intersecting said front face and defining an acutely angled, continuous right cutting edge therebetween, said right cutting edge being opposite said left cutting edge, said right side portion intersecting said front face defining a second obtuse angle therebetween opposite said first obtuse angle; and a bottom portion opposite said top portion and extending between said left and right side portions, said bottom portion having a bottom left section connected to said left side portion defining one of an obtuse angle and a right angle therebetween and a bottom right section connected to said right side portion defining one of an obtuse angle and a right angle therebetween, said bottom left section and said bottom right section meeting at approximately said longitudinal axis of rotation, said bottom left section being at an angle relative to said front and back faces, said bottom left section intersecting said back face and defining an acutely angled left bottom cutting edge therebetween, said left bottom cutting edge being continuous with said left cutting edge, said bottom left section intersecting said front face defining an obtuse angle therebetween, said bottom right section being at an angle relative to said front and back faces, said bottom right section intersecting said front face and defining an acutely angled right bottom cutting edge therebetween, said right bottom cutting edge being continuous with said right cutting edge and being continuous with said left bottom cutting edge, said bottom right section intersecting said front face defining an obtuse angle therebetween.

17. A method of cutting a depression in a work piece with a drill bit having an axis of rotation and a flat drill bit head with first and second side cutting edges parallel to the axis of rotation and a bottom cutting edge extending between the first and second side cutting edges, comprising the steps of:

positioning the drill bit head with the bottom cutting edge adjacent to the work piece;

rotating the drill bit head about the axis of rotation, the drill bit head being rotated by a drill mechanism with the first and second side cutting edges and the bottom cutting edge moving about the axis of rotation;

moving the bottom cutting edge of the rotating drill bit head into engagement with the work piece;

cutting and removing material from the work piece with the rotating bottom cutting edge to form a bottom of a depression;

cutting and removing material from the work piece with each of the first and second side edges to form sidewalls of the depression, the depression having a first width; and after initially forming the sidewalls of the depression, moving the rotating drill bit head in a lateral direction into engagement with the sidewalls to cut with each of the first and second side cutting edges material from the sidewalls and increase the width of the depression greater than the first width.

18. The method of claim 17, further comprising the step of pivoting the drill bit relative to the work piece during the cutting of the material from the sidewalls with the first and second side cutting edges.

19. The method of claim 17 wherein the steps of cutting and removing material from the work piece with the rotating bottom cutting edge and cutting with each of the first and second side cutting edges material from the sidewalls occur simultaneously.

* * * * *